UNITED STATES PATENT OFFICE.

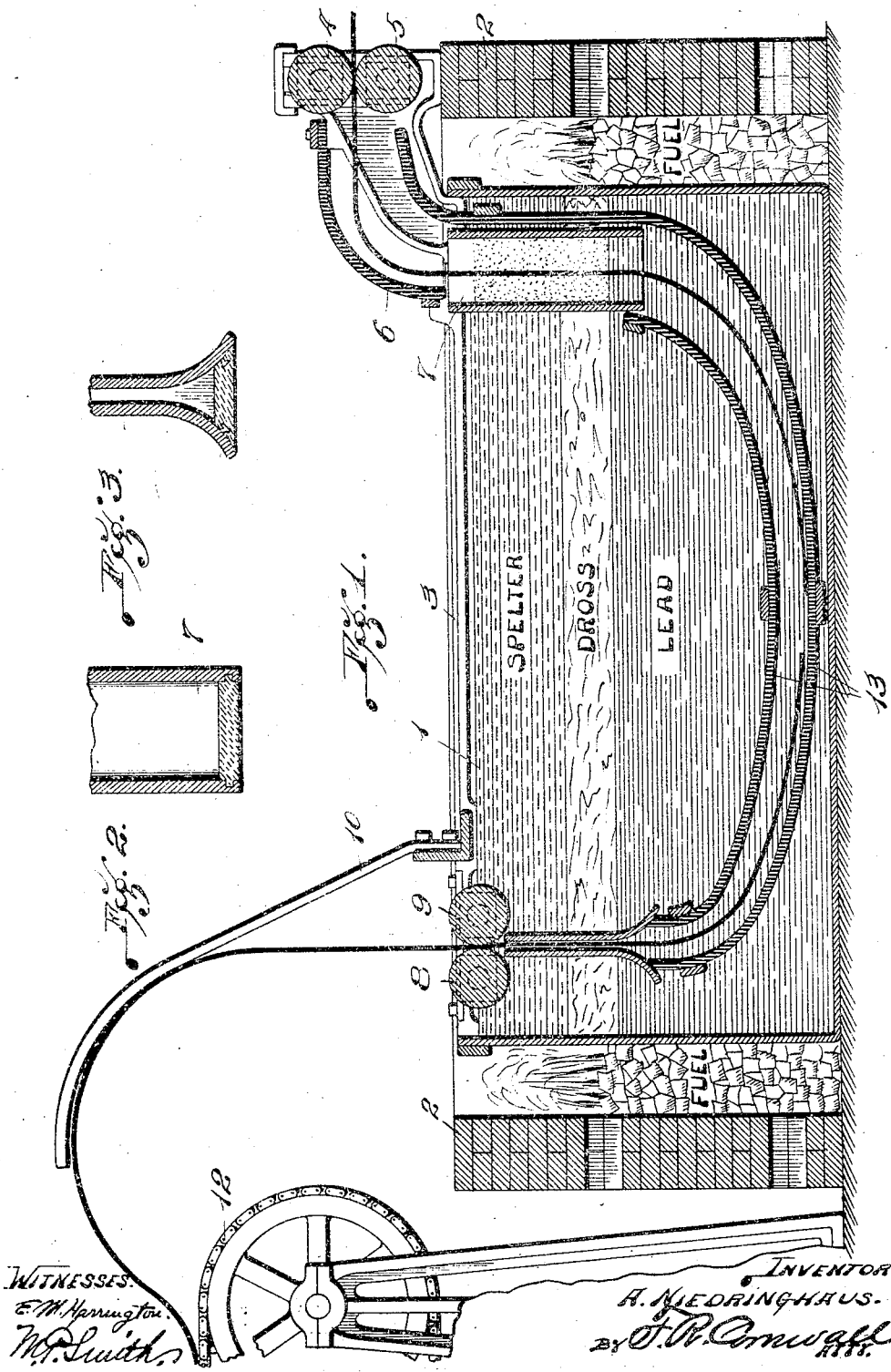

ALEXANDER NIEDRINGHAUS, OF ST. LOUIS, MISSOURI.

GALVANIZING APPARATUS.

969,392.   Specification of Letters Patent.   Patented Sept. 6, 1910.

Original application filed March 11, 1909, Serial No. 482,769. Divided and this application filed December 13, 1909. Serial No. 532,913.

*To all whom it may concern:*

Be it known that I, ALEXANDER NIEDRINGHAUS, a citizen of the United States, residing at St. Louis, Missouri, have invented a certain new and useful Improvement in Galvanizing Apparatus, of which the following is a full, clear, and exact description, such as will enable others skilled in the art to which it appertains to make and use the same, reference being had to the accompanying drawings, forming part of this specification, in which—

Figure 1 is a longitudinal sectional view through my improved galvanizing apparatus. Fig. 2 is a detailed view of the lower end of the flux box before it is introduced into position. Fig. 3 is a detailed view of the lower end of the galvanizing box before it is introduced into position.

This invention relates to a new and useful improvement in galvanizing apparatus.

In the galvanizing of plates where molten lead is used in the bath, a flux box is also used, through which flux box the sheet to be galvanized is passed prior to its introduction into the molten lead bath. Great difficulty has been experienced in the use of these flux boxes because the metal of which they are composed burns out at the lower portion, or is eaten away so that spelter and dross enter and the flux escapes into the kettle. The boxes, therefore, have to be frequently renewed. In introducing a new box into position, the lower open end of the box will trap a quantity of spelter and dross, which in practice has had to be ladled out after the box was submerged in position. It has been found to be impossible, however, to ladle out all of the spelter and dross. The object of the flux box in excluding the spelter and dross is to enable the sheet, after passing through the flux box, to be first treated in the lead bath where it is heated to the proper temperature and thus made in readiness to receive the coating of zinc which more readily adheres to the heated plate, and the plate being of an even temperature throughout, will partake of an even coating of zinc.

My present invention consists in the provision in a flux box of means to exclude spelter and dross in submerging, or partially submerging this box in position. This means in the present instance consists of a breakable bottom wall made of some frangible material such as cement or plaster-of-paris, so that it may be broken when the box is inserted in position to permit the introduction of molten lead into the lower end thereof to the exclusion of dross and spelter, in the instance of the flux box, and to the exclusion of dross in the instance of the box at the discharge end of the tank.

This present application is a division of an application filed by me on or about March 11th, 1909, serially numbered 482,769.

1 indicates the walls of the kettle or tank, around which is a space 2 for the fuel, said fuel burning between the walls 1 and brick walls 3.

4 and 5 are the feed rolls between which the sheets pass in entering the kettle, said sheets striking deflecting finger 6 and being guided down into and through the flux box 7. This flux box, as shown in Figs. 1 and 2, is made of sheet metal and suspended from the walls of the tank. The box is open at its top and bottom, the upper end projecting above the surface of the molten spelter and the lower end of the box projecting below the surface of the molten lead bath. In this box is arranged the fluxing material through which the sheet to be galvanized passes on its way to the molten lead bath, which molten lead bath heats the sheet preparatory to its contact with the molten zinc, which latter material adheres to the surface of the sheet, forming a skin or coat thereon, the sheet passing through squeezing rollers 8 and 9 as it issues from the kettle. Beyond, the kettle sheet is bent over by guide fingers 10 on to the conveyer chain 11, on which chain it is permitted to cool.

It is quite important at the finishing stage to have the dross excluded from the box 12 at the discharge end of the tank and the box 12 therefore bridges the dross, its lower end being submerged in the molten lead bath and its upper end terminating under the rollers 8 and 9 and below the upper surface of the spelter bath. The spelter bath can thus overflow into the box 12 and keep it filled at all times. The dross is an objectionable element in galvanizing. These substances may be impurities in the spelter which drop to the bottom, or impurities in the lead which flow to the top.

As the spelter is used, it is replenished by adding spelter, which melts and overflows into the box 12. The lead, of course, may be replenished in the same way by adding metallic lead when needed. The dross may accumulate and fill up between the lead and spelter to the top of the box 12, the box 12 excluding the dross from the sheets. Should the dross get on the sheet it will leave lumps, which are objectionable. As the dross builds up, it is preferable to remove it by ladling it out, or it can be piled in the center until convenient to remove it so as to float upon the surface of the lead between the flux and galvanizing boxes. I have used the term "galvanizing box" in referring to the box 12, for the reason that it is within this box that the sheet to be galvanized receives its coating of zinc or spelter.

13 represent guiding bars which guide the plate to be galvanized through the molten lead bath. In some kettles rollers are used.

Referring to Fig. 2, 14 is a plug in the lower end of the flux box 7. 15 is a similar plug in the lower end of box 12. This plug is preferably plaster of paris, which is held in position by the walls of the box 7 which are grooved or by keys or ribs, as shown in box 12, and the plug cast therein.

In preparing the flux box to be introduced into position in the kettle, the plug is arranged in place, and the box placed in the kettle. If the plug is of plaster of paris, or other frangible material, it may be broken, and particles will float on the surface of the lead.

I am aware that changes in the construction and arrangement of the several parts of my device can be made and substituted without in the least departing from the nature and principle of my invention.

Having thus described my invention, what I claim is:

1. In a galvanizing apparatus, a flux box having a frangible plug in its bottom.

2. In a galvanizing apparatus, a flux box having a breakable plug in its bottom.

3. In a galvanizing apparatus, a galvanizing box at the discharge end of the tank having a breakable plug in its bottom.

4. In a galvanizing apparatus, a kettle having a stratified spelter and lead bath in combination with a box having its bottom opening into the lead bath and its top into a spelter bath, said box bridging the space occupied by the dross, and a breakable plug in the bottom of the box.

5. In a galvanizing apparatus, a kettle having a bath composed of molten lead and spelter, a flux box whose upper end extends above the surface of the lead, and a breakable plug whose upper end extends above the surface of the spelter and whose lower end extends beneath the surface of the lead, and a breakable plug in the bottom of said box.

In testimony whereof I hereunto affix my signature in the presence of two witnesses, this 11th day of December 1909.

ALEXANDER NIEDRINGHAUS.

Witnesses:
F. R. CORNWALL,
M. P. SMITH.